June 8, 1971  B. R. THOMPSON  3,583,003
ADJUSTABLE LENGTH TRAP
Filed May 23, 1969

Inventor
Bruce R. Thompson
by Oldham & Oldham
attorneys

United States Patent Office 3,583,003
Patented June 8, 1971

3,583,003
ADJUSTABLE LENGTH TRAP
Bruce R. Thompson, Norwood, South Australia, Australia, assignor to Caroma Sales Proprietary Limited, Norwood, South Australia, Australia
Filed May 23, 1969, Ser. No. 827,306
Claims priority, application Australia, May 28, 1968, 38,450
Int. Cl. E03c 1/00
U.S. Cl. 4—191    9 Claims

ABSTRACT OF THE DISCLOSURE

A trap for plumbing fixtures in which the length of the inlet part of the trap can be adjusted in relation to the position of the bend so that the effective height of the trap is adjustable to suit variation between the plumbing fitting such as a sink and the outlet pipe to which the trap must be connected, the invention including a sleeve and an elongated nut engaged over the sleeve which serves to compress between them the necessary sealing washers.

---

This device relates to an adjustable length structure for connecting a riser of a drain outlet trap to a tail pipe of a sink or the like.

The usual construction for a trap is to have an inlet section which terminates in a bend which joins to a riser and which then joins a further bend so shaped that the trap is what is known as a P trap or an S trap.

The inlet section to the trap is usually vertically positioned and is provided with a collar at its top and is engaged by a nut which in turn engages the tail of a sink or basin or the like.

Variations of the shape of the trap are of course known such as those where the riser is provided with a junction which has axial movement to allow the direction of the outlet to be changed, and these traps can be provided with universal outlet ends adapted to take various types of waste pipes.

One of the problems with traps has always been to effectively position the trap in relation to the height of a sink or basin or the like, and this is particularly so where the trap joins to a waste pipe which passes through a wall or the like because obviously with a normal type of trap unless the position of the trap is carefully chosen in relation to the tail leading from the sink or basin, an effective seal by means of a flexible washer or the like is not readily attained as the distance between the bend and the top of the riser is not adjustable.

The object of this invention is to provide an improved form of trap in which there will be a degree of length adjustment of the riser enabling the height of the bend of the trap to be varied somewhat in relation to the position of the tail on the basin or the like.

The object is achieved by providing a nut which is movable axially on the inlet section of the trap in a telescopic manner and by means associated with this nut so arranged that the necessary seals are made between the tail of the sink or basin and the inlet section of the trap.

Thus according to a preferred form the invention comprises a sleeve which at its top, engages the tail of a sink or the like but its lower portion is movable axially on the inlet section of the trap, seals being provided between the tail and sleeve and between the sleeve and inlet section, the sleeve being disposed within an elongated nut which engages the tail and in tightening on the tail compresses a ring seal between the top of the sleeve and the tail and simultaneously compresses a ring seal between the lower end of the sleeve and an inwardly projecting portion at the lower end of the nut which presses this seal against the inlet section. The inlet section is preferably provided with circumferential grooves to give better locking of the length adjustment when the nut is tightened on the tail.

The actual construction of the nut and sealing sleeve can be varied within the spirit of this invention but to enable the nature of the invention to be fully appreciated an embodiment will now be described with reference to the accompanying drawings but it is to be clear that the device need not necessarily be limited to the details shown.

Figure 2:
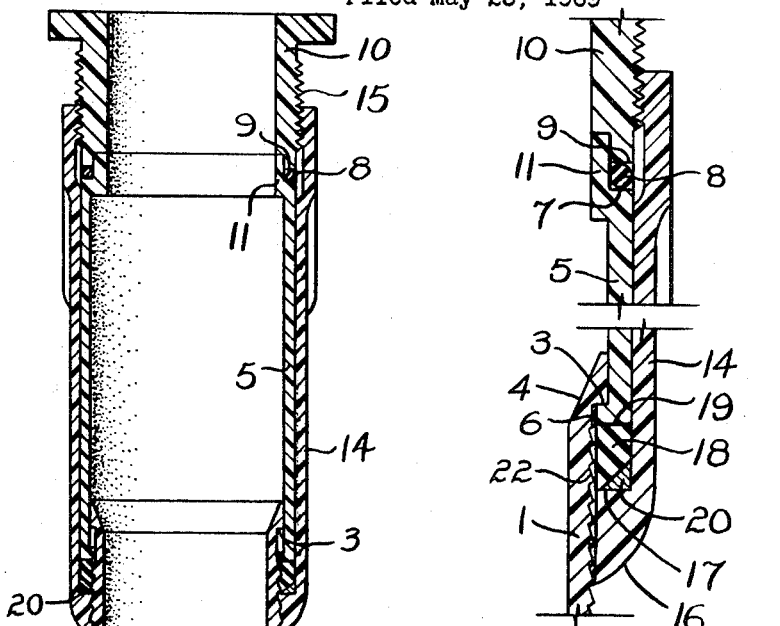
FIG. 2 is an enlarged section of part of the wall of the tail, nut, sleeve and inlet section showing particularly how the seals are formed, FIG. 2 showing the sleeve and nut in fully extended position whereas in FIG. 1 the length is slightly shortened.
Figure 1:
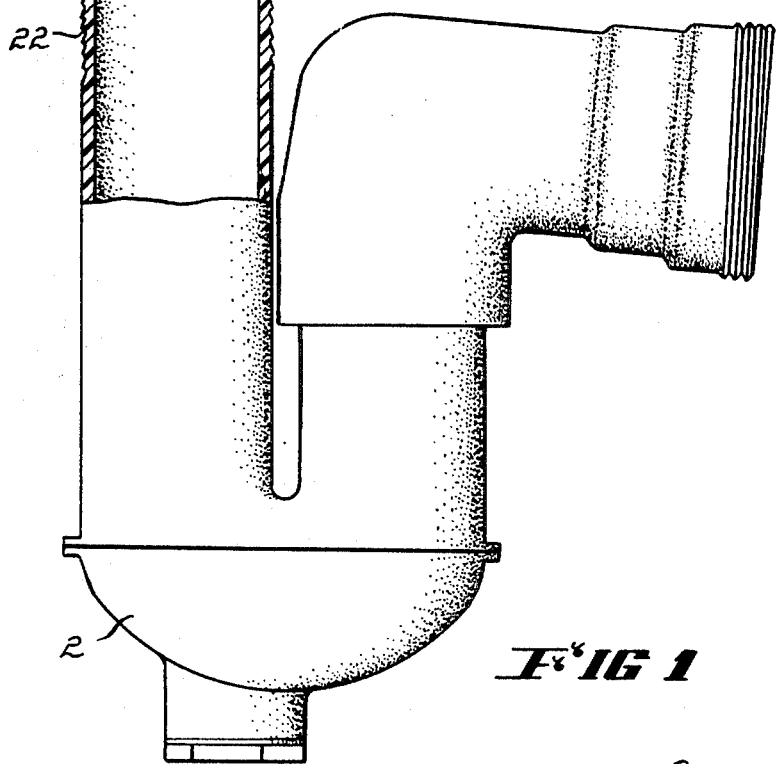
FIG. 1 is a side elevation of a trap with the upper part in section.

The inlet section 1 of a riser to the trap consists of a tubular member terminating at its lower end in the bend 2 of the trap, the upper end of this inlet section 1 being slightly stepped outwards to form a ridge 3, the inner face of the wall of this inlet section having a chamfer 4 to ensure that ready flow of water into the inlet section 1 takes place.

Closely engaging the inlet section 1 of the trap 2 is a sealing sleeve 5 which is provided at its lower end with an annular inward ridge 6 adapted to co-operate with the ridge 3 at the upper end of the inlet section 1 so that this sealing sleeve 5 cannot readily be separated from the inlet section of the trap but can move on the inlet section 1 with an axial movement.

The upper end of the sealing sleeve 5 is provided with a step 7 which is adapted to contain a sealing washer 8 or O ring or the like which in turn is adapted to engage the lower edge 9 of the tail 10, the inside of the sealing sleeve being preferably so shaped at its upper edge that it forms a neat obstruction free joint with the tail when engaged on the tail, and is aligned with the tail this being achieved by the portion 11 which contains the step 7.

Surrounding the sealing sleeve 5 and somewhat longer than the sealing sleeve, is an elongated nut 14 which has an internal thread 15 at its upper end to screw on to the tail 10, and has as its lower end an inwardly formed portion 16 which also neatly engages the inlet section 1 of the trap below the lower end of the sealing sleeve 5, but this lower end is so arranged that a seat 17 is formed on which sealing washer 18 or O ring or the like is engaged which is then held between the seat 17 on the inside of this nut 14 and the bottom edge 19 of the sealing sleeve. A coned ring 20 on the seat can aid compression of the sealing ring.

In this way when the nut 14 is tightened on to a tail 10, pressure is exerted both on the sealing ring 8 at its top and the sealing ring 18 at its bottom so that on the one hand a seal is made between the tail 10 and the sealing sleeve 5 and on the other hand the seal is made between the sealing sleeve 5 and the inlet section 1 of the trap.

As however neither the sealing sleeve 5 or the nut 14 are in a fixed relationship axially with relation to the inlet section 1 to the trap, as both sleeve 5 and nut 14 can slide on the inlet section 1, it is obvious that the effective length of this section can be selected prior to screwing up the nut on the tail, but once the nut 14 is screwed tight the ring 18 is forced hard against the inlet section 1 and cannot then move or leak.

From the foregoing it will be realised that a simple and effective form of unit is provided in which a sealing sleeve 5 is associated with an elongated tubular nut 14 in such a way that a seal can be formed at the upper end between the sealing sleeve 5 and the tail 10 whereas a seal can be made at the lower end between the inlet section 1 of the trap and sealing sleeve 5, but as the sealing sleeve 5 and the nut 14 are slidably engaged on the outer surface of the inlet section 1 to the trap, it is obvious that axial displacement is possible, which can readily take place while there is no axial pressure exerted by the nut on to the two sealing rings 8 and 18 disposed one at each end of the sealing sleeve 5.

To aid the grip of the lower ring 18 on the inlet section 1, this portion of the trap can have on it a series of circumferential shallow grooves 22 so disposed that an O ring or sealing member can move over these grooves when no axial pressure is exerted by the nut 14 until a correct height of trap results, whereupon when the nut 14 is tightened on the tail 10 the sealing member will be forced into firm engagement with the inlet section 1 of the trap and because of the grooves 22 will form an axial lock.

It will be realised of course that irrespective of the position of the inlet section of the trap to the sealing sleeve, that is irrespective of the amount the upper edge of the inlet to the trap extends into the inside of the sealing sleeve, an effective lock can at all times be attained because the ridge at the lower part of the nut which confines the sealing member against the bottom edge of the sealing sleeve, can be drawn upwardly in relation to the sealing sleeve when the upper edge of the sealing member on the sealing sleeve engages the lower edge of the tail, this upward relative motion being effected simply by tightening the nut on the tail.

While one complete embodiment of the invention has been disclosed herein, it will be appreciated that modification of this particular embodiment may be resorted to without departing from the scope of the invention as defined in the appended claims.

What I claim is:

1. An adjustable length trap comprising an inlet section upwardly extending from the bend of a riser of a drain outlet trap for a sink or the like, a sleeve slidably engaging the upwardly extending inlet section, an elongated cylindrical nut engaged over the said sleeve and projecting axially beyond the ends of the sleeve, means at the top of the nut to engage a tail downwardly projecting from a sink or the like, and sealing means between the end of the tail and sleeve and between the sleeve and periphery of the inlet section whereby when the said nut is loosened the sleeve can slide on the inlet section for length adjustment.

2. An adjustable length trap according to claim 1 characterized in that the sealing members are compressed by tightening the nut on the tail to both effect a seal between the tail and sleeve and between the sleeve, nut and inlet section, and at least partially lock the sleeve to the inlet section.

3. An adjustable length trap according to claim 1 characterized in that the sealing means comprise rings disposed between the sleeve and an offset lower end of the tail, and the lower end of the sleeve and a seat on the said nut.

4. An adjustable length trap according to claim 1 characterized by an inwardly extending portion at the lower end of the said nut which forms a seat to confine a seal between it and the lower end of the sleeve and compresses the seal to force it against the inlet section, said sleeve being retained against movement axially towards said tail.

5. An adjustable length trap according to claim 1 characterized by circumferenttial grooves on the outer face of the inlet section to assist locking of the sleeve and nut at a selected position on the inlet section when the nut is tightened on the tail to compresse the seal which engages the inlet section in the grooved area thereof.

6. An adjustable length device arranged for variation of the length between a riser of a drain outlet trap for a sink or the like and the bend on the trap and a nut engaging an externally threaded tail on a sink or the like, said variation being effected by telescopic means forming part of the trap, said telescopic means including a pair of seals, said nut encompassing said telescopic means and operatively engaging said seals to tighten both of them simultaneously.

7. An adjustable length device as in claim 6 comprising said telescopic means including a sleeve shorter than said nut, one of said seals being positioned between adjacent ends of said tail and said sleeve, and the second of said seals being positioned between an end of said sleeve interlocked with said riser and confining areas of said nut and the periphery of said riser, said nut telescopically engaging said riser.

8. An adjustable length trap according to claim 1 characterised in that the sleeve is stepped on its periphery at its upper end to provide a seat for the upper seal which is aligned with a complementary section on the end of the tail.

9. An adjustable length trap according to claim 1 characterised by an outwardly extending ridge at the upper part of the inlet section co-operating with an inward ridge on the lower portion of the said sleeve to prevent withdrawal of the sleeve from the inlet section under normal pressures.

References Cited

UNITED STATES PATENTS

| | | | |
|---|---|---|---|
| 85,559 | 1/1869 | Bolt | 285—175; 298 |
| 948,858 | 2/1910 | Henry, Jr. | 285—269; 298 |
| 1,017,813 | 2/1912 | Schuermann | 285—6.5; 4—191X |
| 1,071,324 | 8/1913 | Lane | 4—188 |
| 1,123,705 | 1/1915 | Dehn | 204—142; 285—298 |
| 1,864,184 | 6/1932 | Cavert | 4—191X; 4—187 |
| 2,268,263 | 12/1941 | Newell et al. | 285—22; 298X |

FOREIGN PATENTS

| | | | |
|---|---|---|---|
| 793,360 | 11/1935 | France | 4—1 |
| 1,188,515 | 3/1965 | Germany | 4—191 |

LAVERNE D. GEIGER, Primary Examiner

D. B. MASSENBERG, Assistant Examiner